United States Patent

[11] 3,599,209

[72] Inventor Hunter C. Goodrich
Collingswood, N.J.
[21] Appl. No. 864,722
[22] Filed Oct. 8, 1969
[45] Patented Aug. 10, 1971
[73] Assignee The United States of America as
represented by the Secretary of the Navy

[54] PHOTOSENSITIVE ARRAY CORRELATOR
6 Claims, 7 Drawing Figs.
[52] U.S. Cl. .................................................. 343/9,
235/181
[51] Int. Cl. .................................................. G01s 9/44
[50] Field of Search ........................................ 343/8, 9;
235/181

[56] References Cited
UNITED STATES PATENTS
3,355,579 11/1967 Robertson .................... 235/181
3,406,396 10/1968 Bosc et al. .................... 343/9
3,441,724 4/1969 Taylor, Jr. .................... 235/181

Primary Examiner—Malcolm F. Hubler
Attorneys—Edgar J. Brower and H. H. Losche

ABSTRACT: A photosensitive array correlator having a linear array of light sensitive elements positionable over the single line scan of a cathode ray tube indicator of a doppler radar receiver in combination with a pseudorandom code generator driving a doppler transmitter and a code propagation shift register with the shift register outputs coupled to provide bipolar supply voltages on a stage-by-stage basis to the array of light sensitive elements, and with the outputs of the light sensitive elements being coupled to a resistance matrix to produce summed voltages of light sensitive elements for analog output of any target range and of velocity measurement. By this construction several target signals can be processed in parallel, $n$th time around range ambiguities are substantially eliminated, the operation of the system provides results equivalent to pulse compression to provide high range resolution, and the target signals are hard to jam.

INVENTOR.
HUNTER C. GOODRICH

PHOTOSENSITIVE SECTION REPEATED 13 TIMES

INVENTOR.
HUNTER C. GOODRICH
BY
H. H. Losche
ATTORNEYS

PHOTOSENSITIVE ARRAY CORRELATOR

BACKGROUND OF THE INVENTION

Modern radars use coded large time-bandwidth signal waveforms to achieve high range and velocity resolution with limited peak transmitted power. Provision of optimum or matched filters for returns from targets of unknown range and velocity normally requires a very large amount of hardware. The correlation process has been shown theoretically to provide an optimum detector, i.e., the best attainable signal-to-noise ratio. Correlation basically requires multiplying each element of a return signal by an element of a sequence-reversed replica or reference of the transmitted waveform and summing or integrating the products of all these elemental multiplications. For search radar this process must be duplicated with references for each possible range delay and each possible velocity-induced doppler carrier shift. For those delays and doppler shifts where the correlation function is a maximum, the return and reference are said to match or correlate.

SUMMARY OF THE INVENTION

In the present invention a photosensitive array correlator processes returns from a very large number of range-velocity resolution cells essentially in parallel in real time with a relatively simple integrated device. Each photoconductive cell is an elemental multiplier since its output current is the product of the signal elemental light intensity and the applied elemental shift register reference voltage. Summing, with weighting for carrier doppler shift, is done in the doppler resistor matrix. The summed currents will produce a unidirectional output pulse and the time of the output pulse indicates the range of the target. For noncorrelating positions of the reference code the positive and negative currents substantially cancel. It is accordingly a general object of this invention to provide a photosensitive array overlay for the cathode ray tube single line scan processor of a doppler search radar with a connected code propagation shift register supplying reference voltages and with a resistance matrix connected to the array outputs to produce summed signals timed to give target range and velocity measurements.

BRIEF DESCRIPTION OF THE DRAWINGS

These and other objects, advantages, features, and uses will become more apparent to those skilled in the art as a more detailed description proceeds when considered along with the accompanying drawings, in which.

DESCRIPTION OF THE PREFERRED EMBODIMENT

Figure 1:
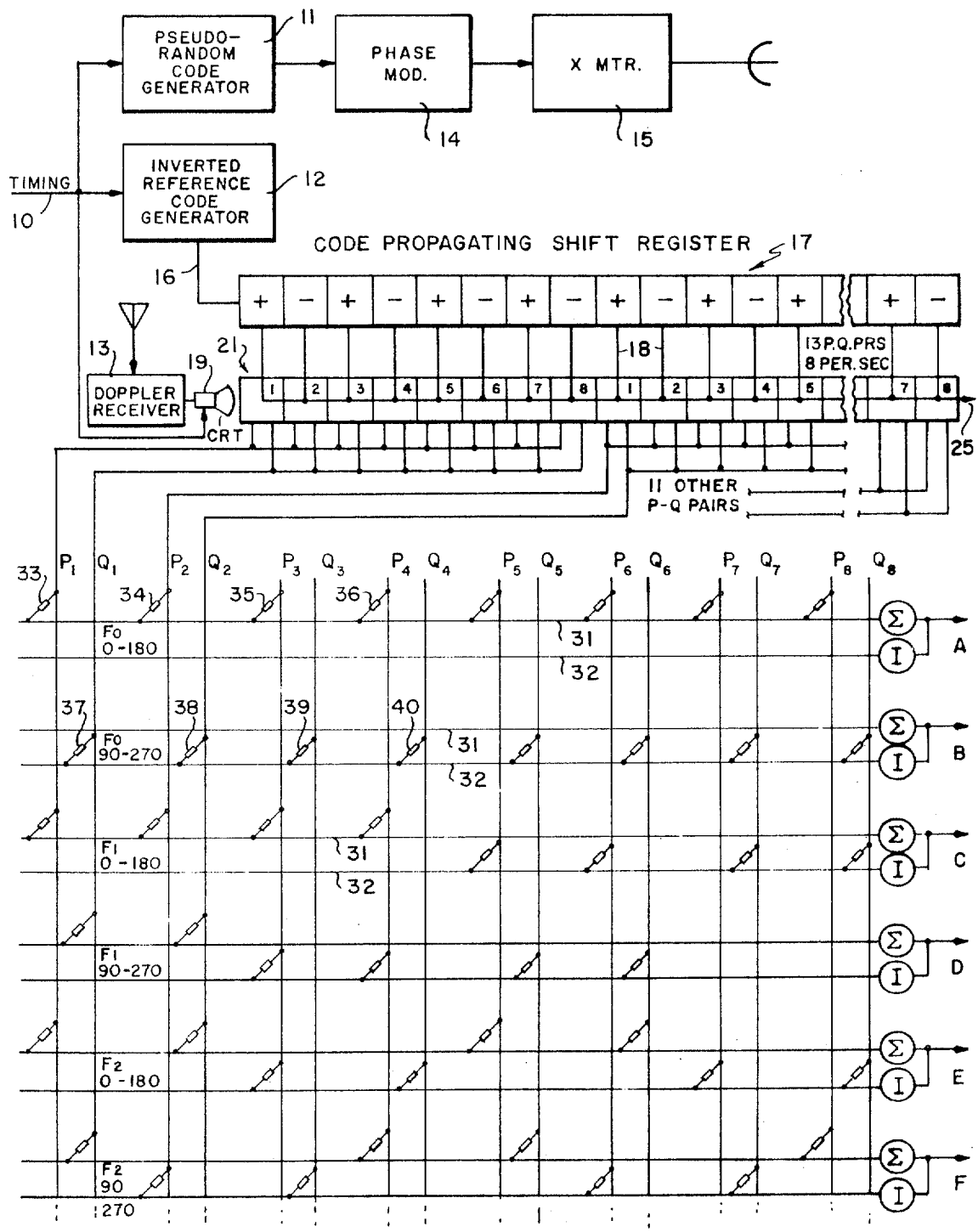
FIG. 1 is a circuit schematic partially in block and partially in circuit diagram of the invention in its environment.

Referring more particularly to FIG. 1, radar timing pulses are applied over the conductor means 10 in parallel to a pseudorandom binary code generator 11, an inverted sequence reference code generator 12, and the display tube of a doppler radar receiver 13. The pseudorandom binary code generator has its output coupled through a phase modulator 14 to a radar transmitter 15 to transmit biphase code signals. The inverted sequence reference code generator 12 has an output 16 coupled as an input to a code propagation shift register 17 consisting of 104 stages each stage of which is capable of producing a positive voltage output or a negative voltage output alternately. These output from the code propagation shift register 17 are represented generally by the reference character 18. The doppler radar receiver 13 is of the well-known type coupled to produce a trace of any received target signals on a cathode-ray tube (CRT) 19 constituting a doppler radar single line scan processor. The trace of the CRT 19 is intensity modulated by radar intercepted target signals, this modulating CRT signal being applied on a low frequency IF carrier instead of the video signal. The IF frequency is chosen so that there is essentially one IF carrier cycle for each video code bit. The phosphor screen of the CRT stores the radar received signal long enough to obtain correlation of the transmitted and received signals.

A photosensitive array of linear elements is illustrated by the linear contiguous blocks 21 consisting of 104 elements of two light sensitive cells per element providing 208 cells in all. The photosensitive array of elements 21 for corresponding light sensitive cells have one each photosensitive cell of eight photosensitive elements coupled in common and the other photosensitive cell of each photosensitive element for each eight elements of the secton coupled also in common, the first output thereof being identified by the reference character $P_1$ and the second set of eight photocell outputs on the single output conductor identified by the reference character $Q_1$. In like manner the second set of eight calls has the output coupled and identified by the reference character $P_2$ while the second set in this section of these elements of eight coupled by the output identified by reference character $Q_2$. In like manner each section of eight cells are coupled to produce $P_3Q_3$, outputs to $P_{13}$, $Q_{13}$ outputs. The P and Q outputs result from multiplication of the shift register outputs and the line scan.

Figure 2:
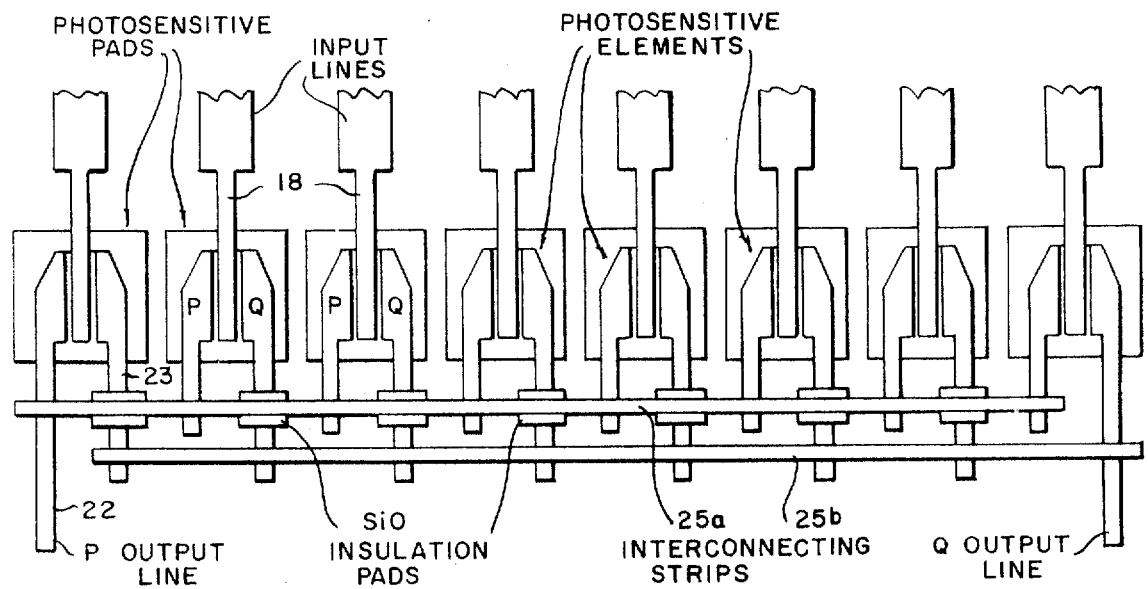
FIG. 2 is a schematic representation of a section of eight photosensitive elements, two photocells to an element.

Referring more particularly to FIG. 2, one section of the array of photosensitive elements is illustrated in diagrammatic form herein which all the P cells coupled to the P outputs are shown to the left of each group of two while the Q cells coupled to the Q outputs are shown to the right in each pair of photosensitive cells. The Q cells are displaced from the P cells by one quarter of the elemental spacing. The CRT sweep rate is controlled so that the space of one intensity modulated IF carrier cycle is essentially equal to the elemental spacing. Thus the one quarter element displacement between P and Q cells corresponds to a 90° displacement of the P and Q sampling points on the signal carrier and provides the quadrature arrangement necessary to acquire the phase relation for the velocity bins to be described. For example, the photosensitive cell 22 may be considered a P cell while the photosensitive cell 23 may be considered a Q cell. This composite photocell has the input 18 from the code propagation shift register 17 positioned between the photocells to supply either positive or negative voltages thereto. Each of the eight cells shown herein consisting of the P cells 22, the Q cells 23, and the input 18, together with the corresponding section of the code propagation shift register 17, produce one output signal P with its quadrature signal Q. The eight P and eight Q cell outputs of a section are combined in parallel by conductors 25a and 25b respectively to form one P and one Q output. The 13 P and Q output signals are combined in a resistor doppler matrix to provide a correlation output pulse. The time of the output pulse indicates the target range and the doppler matrix output line producing the pulse indicates the target velocity, as will hereinafter become more clear as the description proceeds.

The array of photosensitive elements is made on a substrate plate of glass or ceramic. The photosensitive pads are first applied as shown. These are made by silk screen disposition of a sintered photosensitive ink or paste which is then baked, leaving a photosensitive film of the pattern shown. Cadmium-sulfide and cadmium sulfo-selenide, suitably doped, have been used. This layer can also be formed by evaporation through a suitable mask. Tin electrodes are next evaporated, and a layer of aluminum or gold is then evaporated in the same pattern over the tin. Next, the silicon monoxide insulation pads are evaporated. Next the P and Q interconnection strips of aluminum or gold are evaporated. Fanout leads are evaporated from the input lines 18 and output lines P and Q shown to the edge of the substrate. These fanout leads are connected by wire bonds to a heavier printed circuit board fanout to which the circuit leads are soldered. The actual photosensitive cell is formed by the bridging photoconductive film beneath the input and output electrodes.

Figure 3:
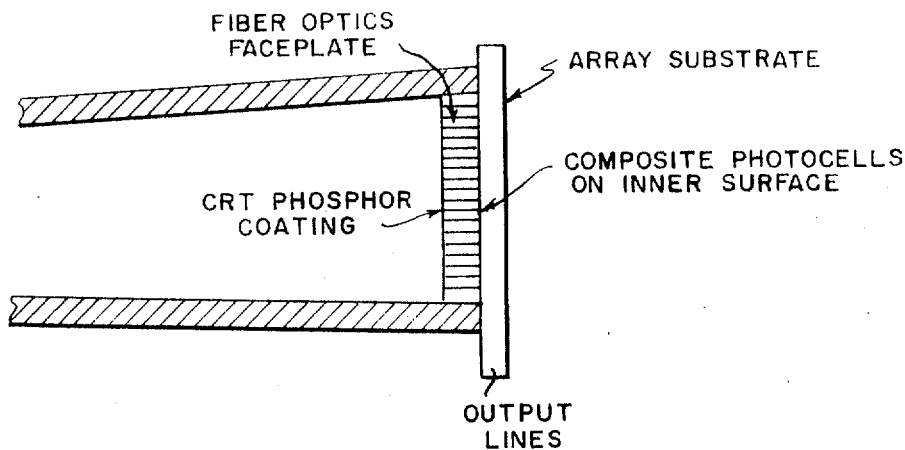
FIG. 3 is a cross section of the CRT-Array.

The optical coupling of the array to the CRT is shown in FIG. 3. The CRT is constructed with a fiber optics faceplate. This is a commercially available type of CRT in which the faceplate is made of a mosaic of transverse optical fibers or "light pipes," so that the image produced on the phosphor layer is brought directly to the outer surface of the faceplate. The array is simply placed against this faceplate with the electrodes and photosensitive pads essentially in contact with the faceplate. The gap (less than 1 mil) can be filled with Canada balsam or oil with an index of refraction that matches that of the glass. It can also be left unfilled, as has been done in tests. The distance from one P cell to the next is 12 mil. The individual cell gap widths are 0.5 mil. The CRT beam diameter was 5 mil, but a 1 or 2 mil beam would be better.

Referring more particularly to FIG. 1 again, the outputs $P_1$, $Q_1$ through $P_{13}$, $Q_{13}$ are coupled as inputs to a resistance matrix, generally referred to herein by the reference character 30. The resistance matrix 30 may be constructed in any well-known manner but is herein illustrated as consisting of a crosshatch of parallel conductors, the vertical conductors being the pairs $P_1$, $Q_1$ through $P_{13}$, $Q_{13}$ and the horizontal conductors being the summing conductors, such as 31, and the inverting conductors, such as 32, shown herein. The resistance matrix 30 is constructed and arranged to produce voltage outputs representative of doppler frequencies which doppler frequencies are representative of velocity of the radar intercepted target. For example, the top pair of output conductors 31 and 32 produce the summed output A, the second pair produce the output B, the third pair produce the output C, etc., throughout the matrix to the last output, herein identified as N. In the first output pair of conductors 31 and 32 the P outputs from the photosensitive elements are coupled through resistors 33, 34, 35, 36, etc., whereby the P outputs are all summed in the output of conductor 31 to match the combination of P outputs that are produced by a doppler frequency $F_o$, and produce a maximum output pulse at A when $F_o$ is present. The inverter conductor 32 is not coupled for this frequency, herein identified as being the frequency $F_o$ or zero frequency, being either in the phase 0° or 180°. For the phases of 90° or 270° the Q outputs are all coupled by resistors 37, 38, 39, 40, etc., throughout all the Q inputs to produce an inverted summation on the output B for the frequency $F_o$. In like manner throughout the resistance matrix the resistors couple the P and Q outputs from the 208 photosensitive cells to the summation and inverted summation conductors to match the several doppler signals $F_1$ through $F_N$ of doppler frequencies, only six outputs A through F being shown herein. For each correlator section the input line, P or Q, having the greatest output for the assumed matching frequencies and starting phase is coupled to the summing lines. The chosen polarity of the summing conductor is made to correspond to the signal polarity at that point so that the matrix output is as large as possible for matching signals. The largest amplitude A through N, then, will represent the target velocity.

Figure 4:
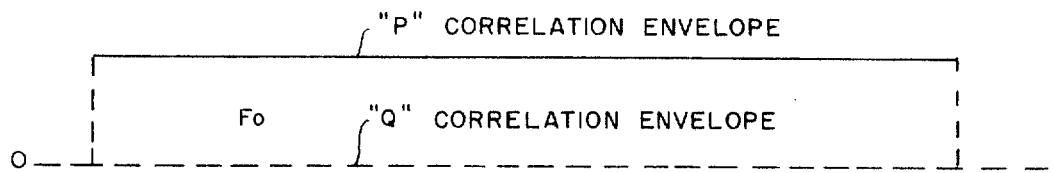
FIGS. 4, 5, and 6 are waveform correlation envelope graphs of the P and Q photocell outputs.
Figure 5:
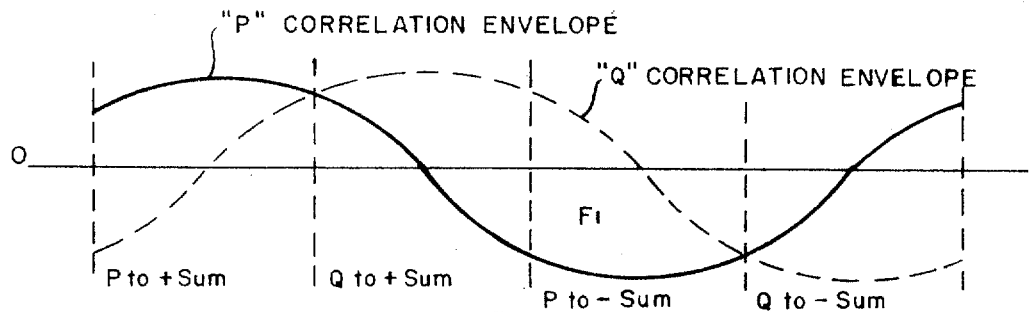
Figure 6:
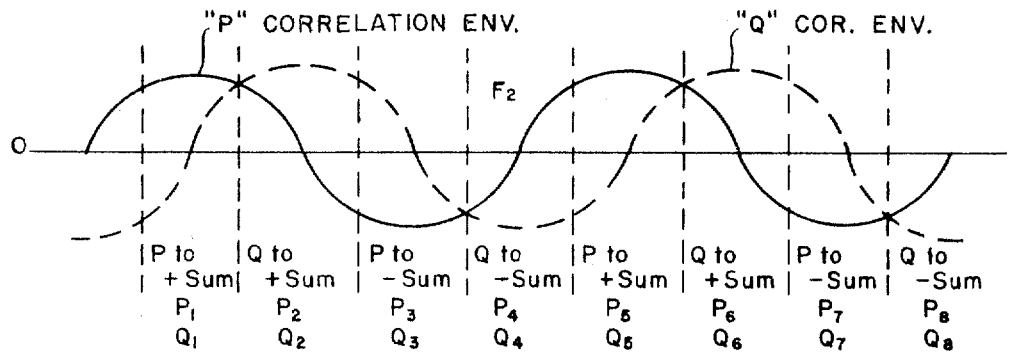

The above matrix coupling may be better understood by referring to FIGS. 4, 5, and 6 herein. For the doppler frequency $F_o$ the P spatial correlation envelope will be flat as shown in FIG. 4. This means that for $F_o$ all the P output voltages have the same phase. In FIG. 5 the envelope or spatial distribution of the P correlation outputs for an $F_1$ signal are shown by the solid line, the Q outputs by the dotted line. These envelopes are 90° out of phase with each other because of the one-quarter cycle spatial offset of the P and Q photosensitive elements from which these signals are derived. For reference, the responses of FIG. 5 have been divided into quadrants. P outputs falling in the first quadrant show a positive voltage and will be coupled to a summing conductor, as 31 in the resistance matrix. In the second quadrant the Q outputs will be coupled to the summing matrix conductor and so on through the four quadrants of the correlation envelope, shown herein. As illustrated in FIG. 6 for the doppler frequency $F_2$ the P spatial correlation envelope is again shown in solid lines and the Q correlation envelope shown in broken lines. As shown in FIG. 6 the $P_1$ through $P_{13}$ and the $Q_1$ through $Q_{13}$ output conductors from the photosensitive elements 21 are coupled to the resistance matrix 30 as shown by quadrants in this figure, each cell in a given velocity channel being coupled to produce the largest possible positive output for a matching signal. These couplings in the matrix may be designated as "phase code cells" and provide the velocity resolution bins.

Figure 7:
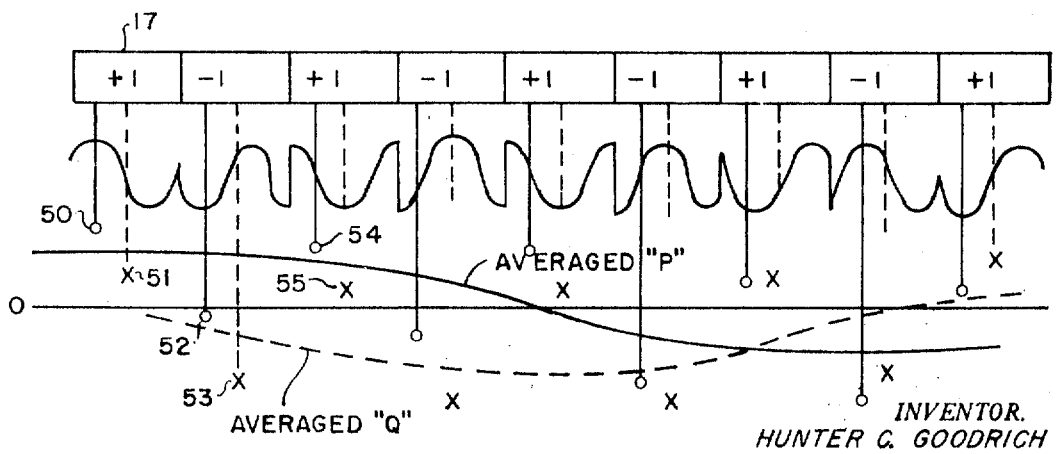
FIG. 7 is a graph representative of the averaged P and Q correlation curves with respect to the correlation of cathode-ray tube carrier frequency and the shift register outputs.

Referring more particularly to FIG. 7 there is illustrated a range-matched signal waveform under a portion of the code propagation shift register 17 to illustrate how the photosensitive cells sample the cathode-ray tube, carrier frequency to produce the averaged P and averaged Q outputs. The signal waveform is representative of the intensity variations of the CRT swept display. The phase discontinuities in the signal waveform represent the 180° transition points as the modulating code went from "−" to "+" or "+" to "−". FIG. 7 is drawn to represent the instant when the reference code in the propagating shift register has moved into position to match the modulation code of the stored CRT return signal. It depicts the condition where target motion, i.e., doppler effect, has lengthened the IF carrier so that each cycle occupies a space slightly longer than the space between photosensitive cells. In FIG. 7 high illumination falls on the first and third P cells from the left; these "+1" voltages from their shift register stages inject relatively large positive currents 50 and 54 into line 25a. The second shift register stage contains a "−1," but since the associated P cell is covered by a dark portion of the CRT signal trace, the negative current 52 into 25a is small. The average of the three currents is relatively large and positive and thus the averaged "p" solid line is drawn high for that region of the correlator. The average of the P currents in the central portion of the figure can be seen to be near zero, and on the right can be seen to be negative. Similarly, the dotted averaged Q line is taken from the average of the Q currents such as 51, 53, and 55. The spatial frequency (closeness of the highs and lows) of the averaged P and Q outputs increases with increasing mismatch between the space of a carrier cycle and the space between photosensitive elements. Thus, FIG. 6 is drawn for a target with twice the velocity of FIG. 5. If there are no targets intercepted by the radar, or if the propagating reference code is not in a position to match the stored return of a target, the positive and negative P and Q outputs will be substantially zero. When a target appears and the reference code has propagated into a matching position, the P and Q outputs will produce a spatial pattern of outputs in the manner shown in FIG. 7, which will be matched in one of the bins of the resistance matrix outputs A through N to provide the highest amplitude voltage denoting target velocity. Target range is indicated by the position of the propagating code in shift register 17 when it matches the light intensified photosensitive elements in the photosensitive array 21 and produces an output on one of the resistance matrix outputs. As shown in FIG. 1 the code propagation shift register 17 produces a plus or minus output on the registered stages in any chosen code sequence herein shown as +1 −1, +1 −1, +1 −1, −1 +1, +1 −1, +1 +1 +1, etc., which matches the sequence of the original coded signal. Accordingly, when correlation is achieved between the propagating code in the shift register 17 and the photosensitive array 21, a unidirectional voltage signal will be produced on the output 25 corresponding in time of occurrence with the range of the target.

OPERATION

In the operation of the device let it be assumed that the radar transmitter 15 has illuminated a single target out in space and the return signals will be received by the doppler receiver 13 to produce a doppler frequency single line scan trace on the screen of the CRT 19. The CRT screen stores this trace momentarily or, equivalently, the storage time of the photoconductivity of the photosensitive cells stores the conductivity pattern established by the CRT trace for a brief interval. Typically both CRT persistance and photoconductive persistance are present. These effects provide a stored conductivity pattern, determined by the return signal, which remains stationary while the array is scanned or interrogated by the reference code which is propagated through the shift register 17. The binary reference code is the same code that is used to modulate the transmitted signal, but is inverted in sequence to match the effective sequence inversion undergone by the signal in the CRT trace recording process. The same timing means is used to control the time of the transmitted signal, the start of the CRT trace and the start of the reference code propagation. The CRT trace is timed so that it will display or write returns from the range window to be examined. The trace proceeds from left to right. The beam is intensity-modulated by the receiver output during the trace. A spatial pattern or replica of the transmitter code on the low frequency IF carrier is written for the target reflection. This pattern is displaced from the left hand end of the trace in proportion to the range of the target within the range window being processed. When the trace has been completed, the reference code starts to progress down the shift register. The reference advances one shift register stage for each shift pulse applied to the register. When the reference code is not in a position to match or correlate with the target pattern on the CRT, the "+1s" and "−1s" fall randomly on the light and dark photocells, and the positive and negative cell currents into lines 25a and 25b substantially cancel, producing no output. When the reference code moves into a matching position with the target return, all the shift register stages containing the same polarity (say +1s) connect to light areas of the photosensitive array while the −1s fall on dark areas. Since the light areas have high conductivity, the positive currents predominate and the correlator output on line 25 is a positive voltage pulse. When the space of a carrier cycle exactly matches the space between photosensitive cells, all the P outputs will have the same polarity at the instant of correlation and will produce maximum output when directly summed as is done on the $F_e$ velocity channels of the resistor matrix 30. When the doppler effect changes the space of the carrier cycles slightly, cells in a given section will continue to have the same polarity, but the polarities from widely separated sections will be different at the instant of correlation from the effect described by FIG. 7. This is why the outputs of the eight adjacent cells are directly combined in each section, but the outputs of the individual sections are combined in the matrix where differences in amplitude and polarity from section to section can be matched. In this case the maximum output will occur from the resistor matrix velocity channel that is resistor coded to match the velocity of the target. The range of the target is indicated by position of the reference code at the instant of correlation. This is conveniently determined by digitally counting the shift pulses occurring up to the instant of the correlator output pulse. The counter is started when the reference code propagation is started and the count is read out whenever a matrix output exceeds a chosen amplitude threshold. The target range within the window being processed is directly proportional to the number of pulses counted and read out. The outputs A through N may also be recorded on a visual display to establish the range and velocity of a target or targets.

By the above means the photosensitive array correlation provides the further valuable function of the equivalent of pulse compression inherent in correlators and it also makes jamming extremely difficult since the jamming of the pseudorandom code is difficult to simulate in a jammer. Further, since both range and velocity resolution can be obtained in a one pulse envelope bases, the blind speeds of the $n$th time around range ambiguities common to conventional pulse doppler radar systems are eliminated.

While many modifications may be made in the constructional details to achieve the results set forth herein, I desire to be limited in the spirit of my invention only by the scope of the appended claims.

I claim:

1. A photosensitive array correlator circuit for a psuedorandom coded doppler radar system having a transmitter and receiver synchronized by a timing means and with a receiver cathode-ray tube single line scan processor that is intensity modulated by radar intercepted targets comprising:
    a linear photosensitive array overlay placed over the screen of said cathode-ray tube, each element of said photosensitive array having two light sensitive cells;
    an inverted reference code generator timed by said timing means and in combination to drive a multistage code propagating shift register with each stage thereof coupled to one each photosensitive element of said array to provide a voltage of either polarity; and
    a resistance matrix having summing cross conductors and inverted summing cross conductors with resistors coupling the outputs of each photosensitive cell in said array in a manner to produce the greatest positive polarity summed output whereby the photosensitive array is illuminated by said cathode-ray tube single line scan to produce light intensified targets in accordance with the transmitted code, said code propagating shift register being shifted until there is correlation between the photosensitive array and said shift register outputs to provide range measurements of the target and the matched frequency producing the greatest amplitude summed voltage output of said resistance matrix providing velocity measurement.

2. A photosensitive array correlator circuit as set forth in claim 1 wherein
    said two photosensitive cells in each photosensitive element are spaced one-quarter of the photosensitive elemental spacing to provide 90° spacing and quadrature signal output of the cells in each element.

3. A photosensitive array correlator circuit as set forth in claim 2 wherein
    said multistage code propagating shift register stages are constructed and arranged to produce a positive output voltage in one state and a negative output voltage in the other state.

4. A photosensitive array correlator circuit as set forth in claim 3 wherein
    said resistance matrix has paired input conductors and paired output conductors, one output conductor being said summing cross conductor and the other output conductor of each pair being said inverted summing cross conductor with the output end thereof having an inverter, the output of which is coupled to the output end of said summing cross conductor for each pair, the two outputs of each photosensitive element constituting a pair conducting said voltages in quadrature to said resistance matrix.

5. A photosensitive array correlator circuit as set forth in claim 4 wherein
    said photosensitive elements are coupled in groups of eight to each pair of conductors to said resistance matrix.

6. A photosensitive array correlator circuit as set forth in claim 5 wherein
    said resistances in said resistance matrix are coupled between said pairs of outputs of said photosensitive elements and said matrix output pairs to match doppler frequencies and phase of said photosensitive elements with said matrix to produce the highest amplitude voltage representative of target velocity.